United States Patent [19]

Moore

[11] Patent Number: 4,603,736
[45] Date of Patent: Aug. 5, 1986

[54] METHOD OF PRODUCING SIDE-POCKET MANDRELS FREE OF WELDS

[76] Inventor: Norman Moore, 2 Lisnalinchy Road West, Ballyclare, County Antrim, Ireland

[21] Appl. No.: 611,002

[22] PCT Filed: Sep. 12, 1983

[86] PCT No.: PCT/GB83/00224
§ 371 Date: May 11, 1984
§ 102(e) Date: May 11, 1984

[87] PCT Pub. No.: WO84/01120
PCT Pub. Date: Mar. 29, 1984

[30] Foreign Application Priority Data

Sep. 11, 1982 [GB] United Kingdom ............... 8225962

[51] Int. Cl.[4] .................... E21B 7/00; B21D 53/00
[52] U.S. Cl. ................... 166/117.5; 29/157 R; 29/558; 29/DIG. 26; 72/340; 138/108; 138/177; 138/DIG. 11
[58] Field of Search ............ 29/157 R, 558, DIG. 26; 72/340; 138/108, 177, 178, DIG. 11; 166/117.5, 237, 242; 417/109, 313

[56] References Cited

U.S. PATENT DOCUMENTS

| | | | |
|---|---|---|---|
| 2,824,525 | 2/1958 | McGowen, Jr. | 417/109 |
| 2,846,014 | 8/1958 | Daffin | 417/109 X |
| 3,101,735 | 8/1963 | Brown | 417/109 X |
| 3,727,684 | 4/1973 | Terral et al. | 166/117.5 X |
| 3,802,503 | 4/1974 | McGinn | 166/117.5 |
| 3,874,445 | 4/1975 | Terral | 166/117.5 |
| 4,201,265 | 5/1980 | Thomason et al. | 166/117.5 |
| 4,271,902 | 6/1981 | Moore, Jr. | 166/117.5 |
| 4,333,527 | 6/1982 | Higgins et al. | 166/117.5 |

FOREIGN PATENT DOCUMENTS 412377 2/1924 Fed. Rep. of Germany .
911721 11/1962 United Kingdom .

Primary Examiner—Howard N. Goldberg
Assistant Examiner—R. S. Wallace
Attorney, Agent, or Firm—Lane & Aitken

[57] ABSTRACT

Method of producing side-pocket mandrels free of welds comprising a series of boring and machining steps by mechanical action and/or electro-erosion to produce a mandrel having at least one valve pocket and discriminator.

7 Claims, 13 Drawing Figures

METHOD OF PRODUCING SIDE-POCKET MANDRELS FREE OF WELDS

This invention relates to a method of producing side-pocket mandrels free of welds.

Mandrels having offset side pockets with seatings for flow control valves to be placed in and removed from the side pockets, are interposed in a string of well tubing, the main bores of the mandrels being aligned with and generally of the same diameter as the bore of the well tubing. The valves are installed in or removed from the seatings therefor in the side pockets by a valve-handling apparatus or kickover tool, means being provided for moving the apparatus through the tubing and mandrels, the latter accommodating at an upper or lower level therein orienting sleeves adapted to guide the valve-handling apparatus into an attitude relative to the valve seating appropriate for installing a valve therein or removing a valve therefrom.

Hitherto, in the construction of side-pocket mandrels in the main, a window has been formed in the side of an elongate tubular body by cutting a segment out of the wall of said body and a fabricated insert has been substituted for the segment and has been welded in the window. In other constructions adjacent tubular members have been joined together using circumferential butt welds.

The majority of the failures that have occured in side-pocket mandrels over the years they have been in use have been directly attributable to weld seams giving way to stresses created in the mandrels as result of forces applied thereto during operational use.

The object of the present invention is to provide a method of producing side-pocket mandrels in which welding is entirely dispensed with and the resulting mandrels are free of welds and thus not subject to the failures hitherto directly attributable to welds.

In accordance with a first aspect of the present invention, a method of producing a side-pocket mandrel comprises (A) Axially boring a cylindrical metal bar of predetermined length and diameter from each of the two ends thereof to predetermined depths to leave a land between the blind bores;

(B) Boring through said land from end to end thereof to provide a bore of smaller diameter than said blind bores and coaxial with or axially offset from but parallel to said blind bores;

(C) Machining through said land at least one bore which is symmetrical about a diametrical plane of said smaller bore is of semicircular arch periphery from one end of said land with the plane and parallel flanks thereof penetrating said smaller bore and effectively forming a window of actuate segmental shape in the periphery of the latter, and continues into a full bore of predetermined peripheral shape forming a valve pocket separated from and axially parallel to said smaller bore and emerging from the other end of said land;

(D) Forming holes through said bar in a chordal plane and intersecting said valve pocket;

(E) Swaging both ends of the bar to provide end lengths of lesser external diameter and axially aligned with said smaller bore;

(F) Trueing the bores in said end lengths to match said smaller bore; and (G) Machining an orienting sleeve in the mandrel near one end thereof.

In accordance with a second aspect of the present invention, a method of producing a side-pocket mandrel comprises (A) Axially boring a cylindrical metal bar of predetermined length and diameter from one end thereof to a predetermined depth to leave a land between the blind bore and the opposite end of the bar;

(B) Boring through said land from end to end thereof to provide a bore of smaller diameter than said blind bore and coaxial with or axially offset from but parallel to said blind bore;

(C) Machining through said land beyond a predetermined depth from said opposite end at least one bore which is symmetrical about a diametrical plane of said smaller bore, is of semicircular arch periphery from one end of said land with the plane and parallel flanks thereof penetrating said smaller bore and effectively forming a window of arcuate segmental shape in the periphery of the latter, and continues into a full bore of predetermined peripheral shape forming a valve pocket separated from and axially parallel to said smaller bore and emerging from the other end of said land into said larger bore;

(D) Forming holes through said bar in a chordal plane and intersecting said valve pocket;

(E) Swaging the larger bore end of the bar to provide an end length of lesser external diameter and axially aligned with said smaller bore;

(F) Trueing the bore in said swaged end length to match said smaller bore;

(G) Machining away the land over said predetermined depth from said opposite end to provide an end length of lesser external diameter;

(H) Machining an orienting sleeve in the mandrel near one end thereof.

In accordance with a third aspect of the present invention, a method of producing a side-pocket mandrel comprises (A) Boring axially offset from end to end leaving a chordal land, a cylindrical metal bar of predetermined length and diameter;

(B) Machining through said land beyond a predetermined depth from said opposite ends at least one bore which is symmetrical about a diametrical plane of said bore, is of semicircular arch periphery from one end of said land with the plane and parallel flanks thereof penetrating said bore and effectively forming a window of arcuate segmental shape in the periphery of the latter, and continues into a full bore of predetermined peripheral shape forming a valve pocket separated from and axially parallel to said bore and emerging from the other end of said land;

(C) Forming holes through said bar in a chordal plane and intersecting said valve pocket;

(D) Machining away the chordal land over said predetermined depths from both ends of the bar to provide end lengths of lesser external diameter; and (E) Machining an orienting sleeve in the mandrel near one end thereof.

In accordance with a fourth aspect of the present invention, a side-pocket mandrel is produced by one of the methods described in next-preceding three paragraphs. Embodiments of the present invention will now be described by way of example, with reference to the accompanying drawings, in which.

Figure 1:
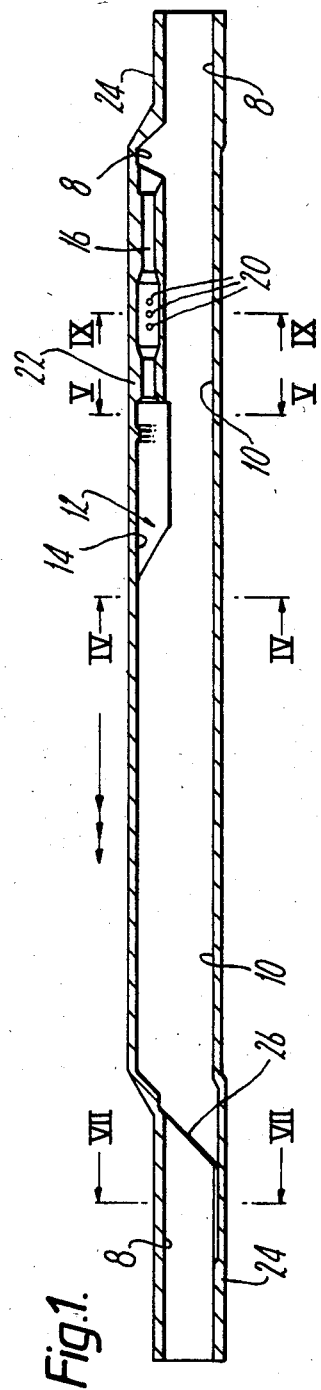
FIG. 1 is a vertical section of a mandrel according to the present invention having a pocket with a short discriminator.

In a first embodiment of the present invention, a side pocket mandrel is formed by axially boring a cylindrical bar of metal, for example of stainless steel or other steels capable of being used in the manufacturing of a mandrel, the bar being of predetermined length and diameter from each of the two ends thereof to predetermined depths to leave a land between the blind bores 8. A bore 10 of smaller diameter than said blind bores 8 is formed by boring through said land from end to end thereof. For mandrels with only one side pocket 12, the smaller bore 10 is axially offset from but parallel to said blind bores 8.

A discriminator and valve pocket are formed in the remainder of the land by machining through said land by mechanical action or by electro-erosion forming firstly a bore 14 which is symmetrical about a diametrical plane of said smaller bore 10 and which is of semi-circular arch periphery from one end of said land with the plane and parallel flanks 18 thereof penetrating said smaller bore 10 and effectively forming a window of arcuate segmental shape in the periphery of the smaller bore 10 thus forming the discriminator and then secondly continuing the machining into a full bore of predetermined peripheral shape forming the valve pocket 16 separated from and axially parallel to said smaller bore 10 and emerging from the other end of the land. A series of holes 20 are formed through the bar wall 22 in a chordal plane and intersecting said valve pocket 16. Both ends of the bar are swaged to provide end lengths 24 of lesser external diameter and axially aligned with said smaller bore 10 and the bores in said end lengths 24 are trued to match said smaller bore 10. Adjacent to the inside end of the end piece next to the discriminator, an orienting sleeve 26 is machined by mechanical action or electro-erosion, said end to be uppermost or lowermost as required when the side mandrel is operative.

Figure 2:
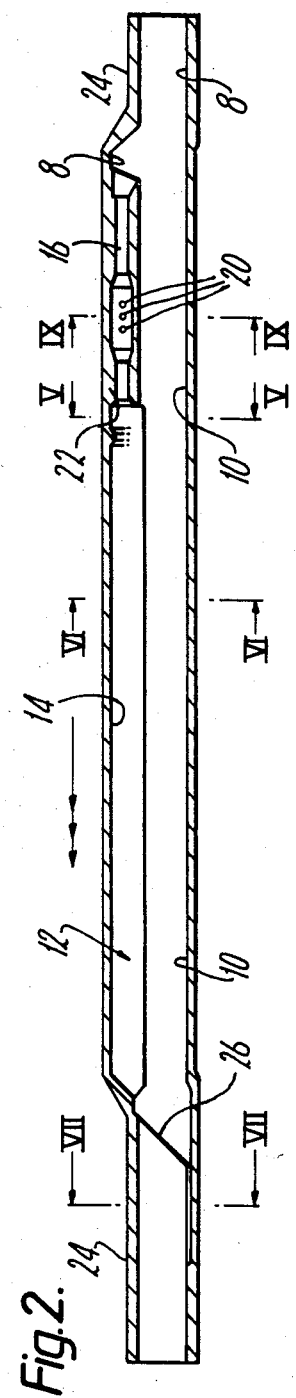
FIG. 2 is a vertical section of a mandrel having a pocket with a long discriminator.

The depth of land left at the first stage after boring into the bar from both ends can vary depending on whether a short discriminator (FIG. 1) or long discriminator (FIG. 2) is required.

Figure 3:
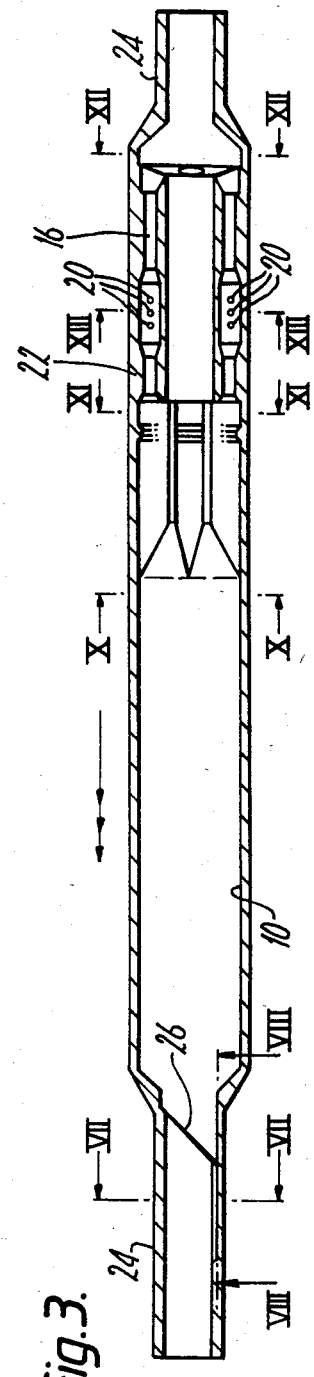
FIG. 3 is a vertical section of a mandrel having four pockets each having a short discriminator.
Figure 4:
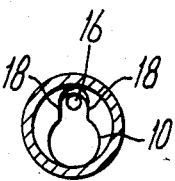
FIG. 4 is a vertical cross-section on the line IV—IV of FIG. 1.
Figure 9:
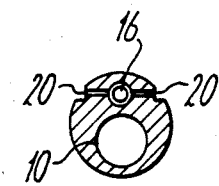
FIG. 9 is a cross-section on the line IX—IX of FIG. 1 or 2.
Figure 5:
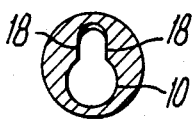
FIG. 5 is a vertical cross-section on the line V—V of FIG. 1 or 2.
Figure 10:
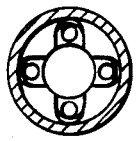
FIG. 10 is a cross-section on the line X—X of FIG. 3.
Figure 6:
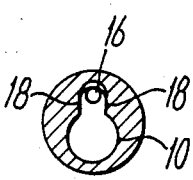
FIG. 6 is a vertical cross-section on the line VI—VI of FIG. 2.
Figure 11:
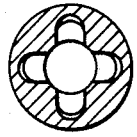
FIG. 11 is a cross-section on the line XI—XI of FIG. 3.
Figure 7:
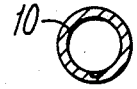
FIG. 7 is a vertical cross-section on the line VII—VII of FIG. 1, 2 or 3.
Figure 12:
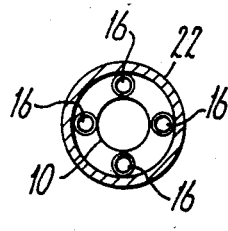
FIG. 12 is a cross-section on the line XII—XII of FIG. 3.
Figure 8:
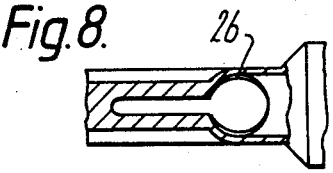
FIG. 8 is a section on the line VIII—VIII of FIG. 3.
Figure 13:
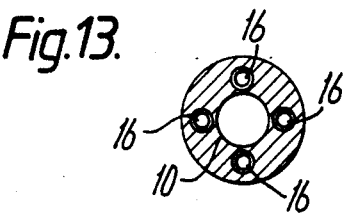
FIG. 13 is a cross-section one the line XIII—XIII of FIG. 3.

In a modification, the smaller bore 10 is coaxial with the blind bores and more than one side pocket 12 is formed, for example (FIG. 3) four spaced at 90 degrees to each other, each pocket having a discriminator and valve pocket 16 with holes 20.

In a second embodiment, the side pocket mandrel is formed by axially boring a cylindrical bar of metal of predetermined length and diameter from one end thereof to a predetermined depth to leave a land between the blind bore 8 and the opposite end of the bars. A bore 10 of smaller diameter than said blind bore 8 is formed by boring through said land from end to end thereof. For mandrels with only one side pocket 12, the smaller bore 10 is axially offset from but parallel to said blind bore 8.

A discriminator and valve pocket are formed in the remainder of the land by machining through said land beyond a predetermined depth from said opposite end by mechanical action or by electro-erosion forming firstly a bore 14 which is symmetrical about a diametrical plane of said smaller bore 10 and which is of semi-circular arch periphery from one end of said land with the plane and parallel flanks 18 thereof penetrating said smaller bore 10 and effectively forming a window of arcuate segmental shape in the periphery of the smaller bore 10 thus forming the discriminator and then secondly continuing the machining into a full bore of predetermined peripheral shape forming the valve pocket 16 separated from and axially parallel to said smaller bore 10 and emerging from the other end of the land into said larger bore. A series of holes 20 are formed through the bar wall 22 in a chordal plane and intersect said valve pocket 16. The larger bore end of the bar is swaged to provide an end length 24 of lesser external diameter and axially aligned with said smaller bore 10 and the bore in said swaged end length 24 is trued to match said smaller bore 10. Adjacent to the inside end of the end piece next to the discriminator, an orienting sleeve 26 is machined by mechanical action or electro-erosion, said end to be uppermost or lowermost as required when the side mandrel is operative.

The depth of land left at the first stage after boring into the bar from both ends can vary depending on whether a short discriminator (FIG. 1) or long discriminator (FIG. 2) is required.

In a modification, the smaller bore 10 is coaxial with the blind bores and more than one side pocket 12 is formed, for example (FIG. 3) four spaced at 90 degrees to each other, each pocket having a discriminator and valve pocket 16 with holes 20.

In a third embodiment, the side pocket mandrel is formed by boring axially offset from end to end leaving a chordal land a cylindrical bar of metal of predetermined length and diameter.

A discriminator and valve pocket are formed by machining through said land beyond a predetermined depth from said opposite ends by mechanical action or by electro-erosion forming firstly a bore 14 which is symmetrical about a diametrical plane of said bore 10 and which is of semi-circular arch periphery from one end of said land with the plane and parallel flanks 18 thereof penetrating said bore 10 and effectively forming a window of arcuate segmental shape in the periphery of the bore 10 thus forming the discriminator and then secondly continuing the machining into a full bore of predetermined peripheral shape forming the valve pocket 16 separated from and axially parallel to said bore 10 and emerging from the other end of the land. A series of holes 20 are formed through the bar wall 22 in a chordal plane and intersect said valve pocket 16. The chordal land over said predetermined depths from each end of the bar are machined away to provide end lengths 24 of lesser external diameter. Adjacent to the inside end of the end piece next to the discriminator, an orienting sleeve 26 is machined by mechanical action or electro-erosion, said end to be uppermost or lowermost as required when the side mandrel is operative.

The predetermined depth of land left at one end at the first stage after boring into the bar from one end can vary depending on whether a short discriminator (FIG. 1) or long discriminator (FIG. 2) is required.

In a modification, the bore 10 is coaxial with bar and more than one side pocket 12 is formed, for example (FIG. 3) four spaced at 90 degrees to each other, each pocket having a discriminator and valve pocket 16 with holes 20.

I claim:

1. A method of producing a side-pocket mandrel comprising:
   (A) axially boring a cylindrical metal bar of predetermined length and diameter from each of the two ends thereof to predetermined depths to leave a land between the blind bores;
   (B) boring through said land from end to end thereof to provide a bore of smaller diameter than said blind bores and coaxial with or axially offset from but parallel to said blind bores;
   (C) machining through said land at least one bore which is symmetrical about a diametrical plane of said smaller bore is of semicircular arch periphery from one end of said land with the plane and parallel flanks thereof penetrating said smaller bore and effectively forming a window of actuate segmental shape in the periphery of the latter, and continues into a full bore of predetermined peripheral shape forming a valve pocket separated from and axially parallel to said smaller bore and emerging from the other end of said land;
   (D) forming holes through said bar in a chordal plane and intersecting said valve pocket;
   (E) swaging both ends of the bar to provide end lengths of lesser external diameter and axially aligned with said smaller bore;
   (F) trueing the bores in said end lengths to match said smaller bore; and
   (G) machining an orienting sleeve in the mandrel near one end thereof.

2. A method of producing a side pocket mandrel comprising:
   (A) axially boring a cylindrical metal bar of predetermined length and diameter from one end thereof to a predetermined depth to leave a land between the blind bore and the opposite end of the bar;
   (B) boring through said land from end to end thereof to provide a bore of smaller diameter than said blind bore and coaxial with or axially offset from but parallel to said blind bore;
   (C) machining through said land beyond a predetermined depth from said opposite end at least one bore which is symmetrical about a diametrical plane of said smaller bore, is of semicircular arch periphery from one end of said land with the plane and parallel flanks thereof penetrating said smaller bore and effectively forming a window of arcuate segmental shape in the periphery of the latter, and continues into a full bore of predetermined peripheral shape forming a valve pocket separated from and axially parallel to said smaller bore and emerging from the other end of said land into said larger bore;
   (D) forming holes through said bar in a chordal plane and intersecting said valve pocket;
   (E) swaging the larger bore end of the bar to provide an end length of lesser external diameter and axially aligned with said smaller bore;
   (F) trueing the bore in said swaged end length to match said smaller bore;
   (G) machining away the land over said predetermined depth from said opposite end to provide an end length of lesser external diameter;
   (H) machining an orienting sleeve in the mandrel near one end thereof.

3. A method of producing a side-pocket mandrel comprising:
   (A) boring axially offset from end to end leaving a chordal land, a cylindrical metal bar of predetermined length and diameter;
   (B) machining through said land beyond a predetermined depth from said opposite ends at least one bore which is symmetrical about a diametrical plane of said bore, is of semicircular arch periphery from one end of said land with the plane and parallel flanks thereof penetrating said bore and effectively forming a window of arcuate segmental shape in the periphery of the latter, and continues into a full bore of predetermined peripheral shape forming a valve pocket separated from and axially parallel to said bore and emerging from the other end of said land;
   (C) forming holes through said bar in a chordal plane and intersecting said valve pocket;
   (D) machining away the chordal land over said predetermined depths from both ends of the bar to provide end lengths of lesser external diameter; and
   (E) machining an orienting sleeve in the mandrel near one end thereof.

4. A side-pocket mandrel free of welds having at least one side pocket and discriminator when produced in accordance with claims 1, 2 or 3.

5. A side pocket mandrel comprising:
   an elongate block of material;
   a swaged end on each end of said elongate block defining the exterior of the side pocket;
   a through bore passing lengthwise through said block and being substantially concentric with said swaged ends;
   a valve pocket in said side pocket in said elongate block parallel to and separated from said through bore; and
   a discriminator on one end of said valve pocket that opens said valve pocket into said through bore,
   thereby providing a weld-free mandrel having improved durability.

6. The side-pocket mandrel claimed in claim 5 wherein said valve pocket extends substantially the entire length of said side pocket.

7. The side-pocket mandrel claimed in claim 5 wherein at least two valve pockets are formed in said mandrel and said through bore is concentric with the long axis of said block.

UNITED STATES PATENT AND TRADEMARK OFFICE
CERTIFICATE OF CORRECTION

PATENT NO. : 4,603,736

DATED : August 5, 1986

INVENTOR(S) : Norman Moore

It is certified that error appears in the above-identified patent and that said Letters Patent is hereby corrected as shown below:

Column 1, line 56, delete "actuate" and substitute therefor --arcuate--.

Column 5, line 33, delete "actuate" and substitute therefor --arcuate--.

Signed and Sealed this

Twenty-third Day of December, 1986

Attest:

DONALD J. QUIGG

Attesting Officer   Commissioner of Patents and Trademarks